United States Patent

Wunderlich

[11] Patent Number: 5,956,238
[45] Date of Patent: Sep. 21, 1999

[54] BLOCKING TIME MAINTENANCE CIRCUIT FOR ZVS CONVERTERS

[75] Inventor: Ronnie A. Wunderlich, Endicott, N.Y.

[73] Assignee: Celestica North America Inc., Toronto, Canada

[21] Appl. No.: 09/105,803

[22] Filed: Jun. 24, 1998

[51] Int. Cl.$^6$ ............................................. H02M 3/335
[52] U.S. Cl. ............................ 363/17; 363/75; 363/82; 363/91; 363/132
[58] Field of Search ............................ 363/17–26, 56, 363/58, 75, 82, 91–93, 97, 98, 131–134

[56] References Cited

U.S. PATENT DOCUMENTS

| | | | |
|---|---|---|---|
| 4,419,723 | 12/1983 | Wilson, Jr. | 363/21 |
| 4,517,633 | 5/1985 | Melcher | 363/21 |
| 4,591,966 | 5/1986 | Smith | 363/91 |
| 4,623,834 | 11/1986 | Klingbiel et al. | 323/258 |
| 4,811,187 | 3/1989 | Nakajima et al. | 363/25 |
| 4,860,145 | 8/1989 | Klingbiel | 361/18 |
| 4,860,189 | 8/1989 | Hitchcock et al. | 363/132 |
| 4,931,918 | 6/1990 | Inou et al. | 363/19 |
| 5,132,889 | 7/1992 | Hitchcock et al. | 363/17 |
| 5,157,592 | 10/1992 | Walters | 363/17 |
| 5,418,703 | 5/1995 | Hitchcock et al. | 363/17 |
| 5,442,540 | 8/1995 | Hua et al. | 363/98 |
| 5,521,808 | 5/1996 | Marusik et al. | 363/49 |
| 5,539,630 | 7/1996 | Pietkiewicz et al. | 363/17 |
| 5,563,775 | 10/1996 | Kammiller | 363/17 |
| 5,654,880 | 8/1997 | Brkovic et al. | 363/17 |

*Primary Examiner*—Adolf Deneke Berhane
*Attorney, Agent, or Firm*—Alexander Porat; Blake, Cassels & Graydon

[57] ABSTRACT

The blocking time maintenance circuit is applied to a resonant-transition ZVS power converter having saturable core reactors to induce a current in the primary of the transformer which enables ZVS. The circuit includes a peak detector for producing a signal having a magnitude proportional to an input voltage. A biasing mechanism, comprising a current source, is provided in order reset the saturable core reactors in a controlled manner. A control mechanism is connected to the peak detector and the current source in order to generate a reset current, the magnitude of which is correlated to the input voltage. In this manner, the volt-time product of the saturable reactors is varied, thereby maintaining the blocking time relatively constant over a wide range of input voltages and ensuring that the output voltage does not fall out of regulation.

15 Claims, 5 Drawing Sheets

BLOCKING TIME MAINTENANCE CIRCUIT FOR ZVS CONVERTERS

FIELD OF INVENTION

The invention generally relates to switch mode power converters, and more specifically to a blocking time maintenance circuit for resonant-transition zero voltage switching (ZVS) power converters which employ saturable core reactors.

BACKGROUND OF INVENTION

The size of power converters in modern electronic equipment has been reduced by designing converters which use high switching frequencies. By operating at high frequencies, the inductive and capacitive energy storage devices in the power converters may be made smaller than would otherwise be possible at lower frequencies. One drawback of operating at higher frequencies is reduced converter efficiency due to greater switching losses. These switching losses are incurred when the transistor switches of the converter are turned on.

Switching losses may be minimized by ensuring that the transistors in the converter are only turned on when the voltage and/or current across the transistors is as close to zero as possible.

One class of converter, known as zero voltage, resonant-transition converters, reduces switching losses by achieving ZVS at a fixed switching frequency. U.S. Pat. No. 4,860,189 to Hitchcock discloses one such converter wherein zero voltage switching is achieved by using energy stored in the leakage inductance and magnetizing inductance of the primary of the main transformer during the primary on-time to charge the parasitic capacitors of the field effect transistor (FET) switches during the free-wheeling stage of operation.

U.S. Pat. No. 5,132,889 to Hitchcock et al. discloses an improvement which enables the ZVS resonant-transition converter to maintain operation over a full load range. The improved converter includes an H-bridge or full bridge switching circuit with FET switches in each leg thereof The primary of a center-tapped transformer is connected across the bridge. A saturable core reactor and an output rectifier are connected in series with each secondary winding of the center-tapped transformer. The saturable core reactors provide a blocking function which forces a freewheeling current induced by the output inductor to substantially flow through only one of the secondary windings for a predetermined time interval (the "blocking interval") of at least a portion of the freewheeling stage of operation. By blocking current in one half of the rectifier circuit during the freewheeling stage the output inductor sustains a current in the secondary winding, thereby inducing a current in the primary winding. The current in the primary winding charges the parasitic capacitance in the FET switches such that each FET is turned on only when the voltage across it is near zero. In the absence of the saturable reactors, the current induced by the output inductor would be split between the two secondary windings and would "cancel" each other out without inducing additional current in the primary winding. Without the additional current in the primary winding there may not be enough energy in the primary side of the transformer to charge/discharge the parasitic capacitances of the FET switches in order to achieve ZVS.

One shortcoming with the resonant-transition ZVS converter stems from the fact that the blocking time interval must remain relatively constant with respect to the switching frequency. The blocking time, as well as the saturable reactors, are selected or designed with reference to a nominal input voltage. In some applications, such as telecommunication applications where battery backup power may be employed, or with arc welding equipment, the input voltage may vary considerably from the nominal value. Saturable core reactors, however, block a constant volt-time. Thus, as the input voltage decreases the blocking time increases which results in a decrease in the effective duty cycle of the converter. This means that the blocking time is excessive for low input voltages (relative to the nominal value) yet there may not be enough blocking time for high input voltages. So, for relatively low input voltages, the output voltage may go out of regulation because there is not enough duty cycle, and at relatively high input voltages, the converter may not achieve ZVS because there is not enough blocking time.

SUMMARY OF INVENTION

The invention provides a blocking time circuit which solves the above-noted problem by varying the volt-time product of the saturable core reactors as a function of the input voltage. This ensures that the blocking time remains relatively constant over wide ranges in the input voltage, thereby ensuring that there is enough effective duty cycle to maintain regulation at low input voltages (relative to a nominal input voltage) and enabling ZVS switching at relatively high input voltages.

Broadly speaking, the blocking time circuit, in combination with a saturable core reactor adapted to provide a blocking time, comprises a peak detector for determining the voltage applied across the saturable core reactor; biasing means, comprising a current source, for resetting the cores of the saturable reactors; and control means, connected to the peak detector, for controlling the current source to produce a core reset current having a magnitude correlated to the applied voltage in order to maintain a relatively constant blocking time over a range of applied voltages.

As applied to the resonant-transition ZVS converter, the blocking time circuit comprises a peak detector, preferably connected to the secondary side of the transformer, in order to produce a signal having a magnitude proportional to the input voltage. A biasing means, comprising a current source, is provided in order reset the saturable core reactors in a controlled manner. In the preferred embodiment, the biasing means includes a reset winding applied to each saturable core reactor, and the current source includes a transistor. A control means, such as a voltage divider network, is connected to the peak detector and the current source in order to control the amount of reset current used to reset the core. The magnitude of the reset current is correlated to the input voltage, and hence the volt-time product of the saturable reactors is correlated to the input voltage. Thus, for example, when the input voltage drops below a nominal input voltage the reset current drops accordingly so that the volt-time product of the saturable reactors is decreased. This keeps the blocking time relatively constant over a relatively wide input voltage range.

BRIEF DESCRIPTION OF DRAWINGS

The foregoing and other aspects of the invention will become more apparent from the following description of the embodiments thereof and the accompanying drawings which illustrate, by way of example only, the principles of the invention. In the drawings.

DETAILED DESCRIPTION OF PREFERRED EMBODIMENTS

Figure 1:
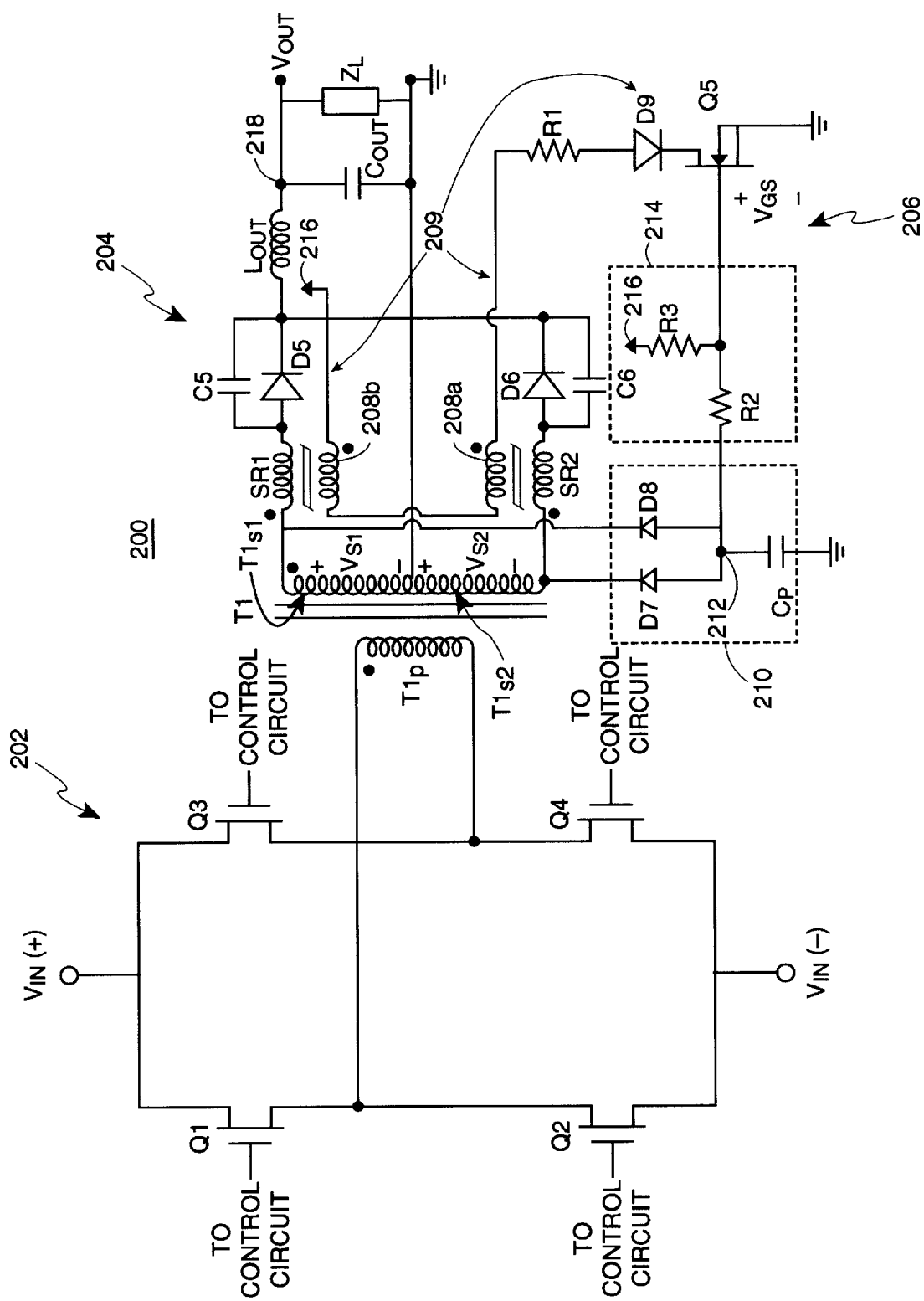
FIG. 1 is a circuit diagram of a resonant-transition ZVS converter including a blocking time maintenance circuit according to a preferred embodiment.

FIG. 1 illustrates a full bridge, resonant-transition, ZVS converter 200 which comprises a switching circuit 202, and a rectifier and output filter circuit 204 including two saturable core reactors SR1 and SR2. The operation of the converter 200 (excluding blocking time maintenance circuit 206) is fully described in U.S. Pat. No. 5,132,889 and hence only the shortcomings thereof are discussed.

During the freewheeling stage of operation, the energy stored in the output inductor $L_{OUT}$ induces a current to flow in the center-tapped transformer secondary $T1_S$. During each freewheeling stage, one of the saturable reactors SR1 or SR2 is saturated and freely conducts while the other is in the high inductance or blocking state, thus forcing the current provided by $L_{OUT}$ to flow through the saturated reactor. As described previously, by forcing current through only one secondary winding, a reflected current is induced in the primary winding $T1_P$ in order to enable the switching circuit 202 to achieve ZVS.

A saturable reactor can be characterized in its blocking state by the equation $$V(t) = L\frac{di}{dt}, \quad \text{if } i < I_{SAT} \tag{1}$$

where L is the inductance exhibited by the saturable reactor in the blocking state, i is the applied current, and $I_{SAT}$ is the saturation current.

Let $t_b$ be the time required for the saturable reactor to become saturated, and V the voltage across the reactor at that time. Assuming a linear relationship, then $$V = L * \frac{I_{SAT}}{t_b} \tag{2}$$

and hence $$V*t_b = L*I_{SAT} = \text{constant} \tag{3}$$

It will be seen from equation (3) that the saturable reactors exhibit a constant volt-time product.

Referring to FIG. 1, it will be seen that the input voltage $V_{IN}(t)$ is substantially applied across the transformer primary winding $T1_P$. The voltages $V_{S1}$ and $V_{S2}$ across the transformer secondary windings $T1_{S1}$ and $T1_{S2}$ will therefore respectively be $+V_{IN}(t)/N$ and $-V_{IN}(t)/N$, where N is the turns ratio of transformer T1. Thus, during the start of the power stage the (absolute) voltage across the saturable core reactor which is in the blocking state is approximately $2V_{IN}(t)/N$.

Figure 2:
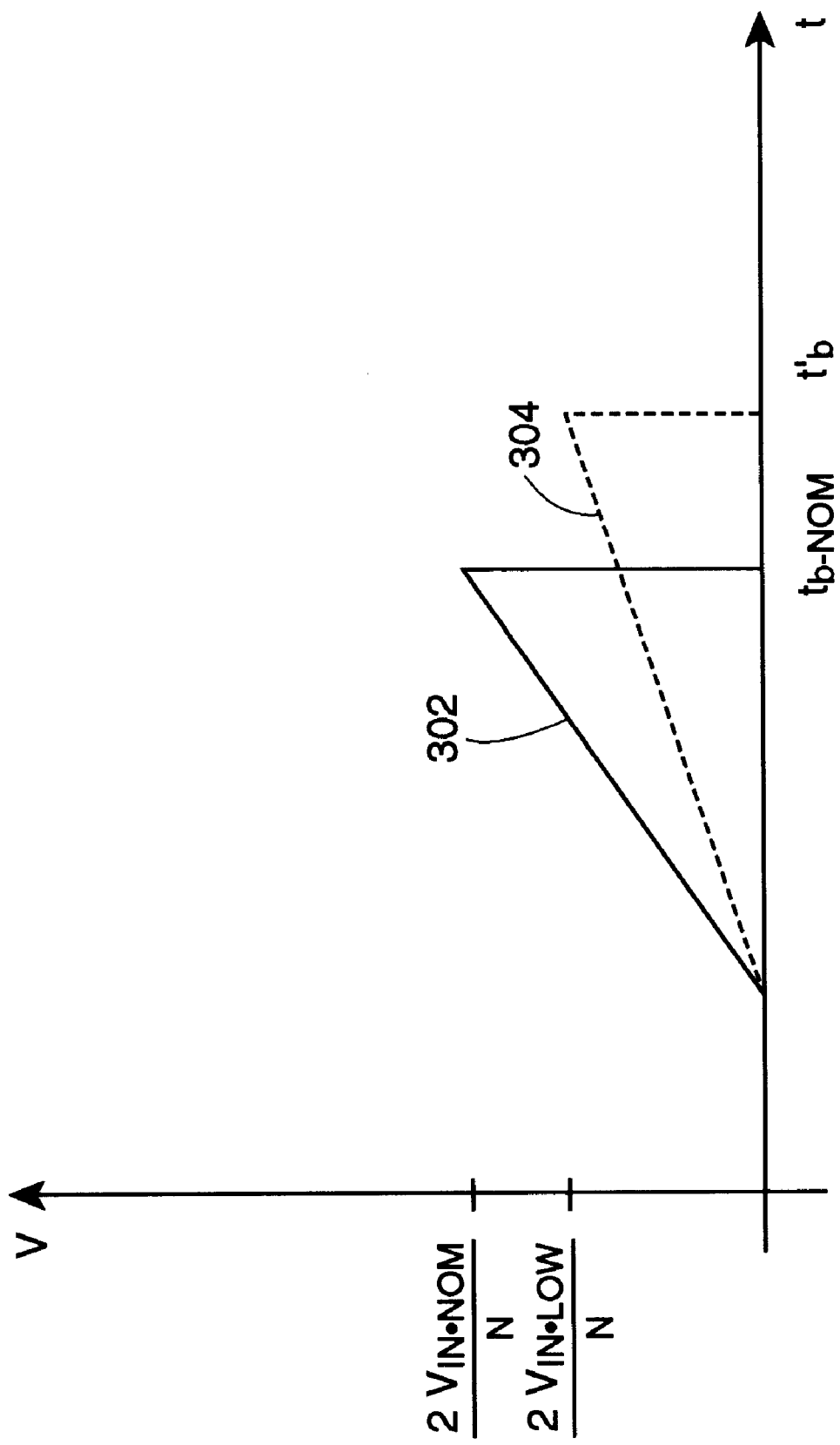
FIG. 2 is a graph illustrating the constant volt-time product of a saturable core reactor.

Accordingly, if the input voltage $V_{IN}(t)$ drops from a nominal input voltage $V_{IN-NOM}$ to a lower voltage $V_{IN-LOW}$, the blocking time $t_b$ of the saturable core reactors win increase in proportion to $V_{IN-NOM}/V_{IN-LOW}$ (or in other words, inversely proportional to the percentage difference x between $V_{IN-NOM}$ and $V_{IN-LOW}$, i.e., where $V_{IN-LOW}=x*V_{IN-NOM}$). This characteristic is also graphically portrayed in FIG. 2 wherein it will be noted that the volt-time product, represented by the area under a graph line, remains constant when the voltage across the saturable core reactor drops from $2V_{IN-NOM}/N$ (graph line 302) to $2V_{IN-LOW}/N$ (graph line 304), thereby causing the blocking time to increase by a factor $1/x$ from $t_{b-NOM}$ to $t_b'$ (i.e., $t_b'=1x*t_{b-NOM}$).

The drop in the input voltage from $V_{IN-NOM}$ may be caused by various factors including a switch from line voltage (supplied by the electric utility company) to battery backup power in an uninterruptible power supply. It is possible to maintain the input voltage at a constant level during drops in the supply by providing very large input capacitors to smooth out voltage drops. However, this solution requires expensive and large capacitors and only solves the problem for temporary drops in the input voltage.

The blocking time $t_b'$ may assume a period longer than is required to achieve ZVS in the switching circuit 202. The increased blocking time reduces the effective duty cycle of the converter such that $V_{OUT}(t)$ goes out of regulation, i.e., falls below its desired level. This problem is more easily appreciated by reference to the equation, $$V_{OUT}(t) = \frac{D * V_{IN}(t)}{N} \tag{4}$$

where D is equal to the duty cycle.

For example, a converter may have a nominal input voltage $V_{IN-NOM}$ of 400V, and a desired regulated output voltage $V_{OUT}$ of 25V. At 400V, the saturable reactors in this particular example have a blocking time of 300 nanoseconds, and the maximum duty cycle ($D_{MAX}$) is 0.9 in a one microsecond switching period. If $V_{IN}(t)$ drops to 300V (i.e. $V_{IN-LOW}=0.75*V_{IN-NOM}$) the blocking time $t_b$ of the saturable reactors increases by a factor of 1.33 to 400 nanoseconds. The extra 100 nanoseconds of blocking time could reduce $D_{MAX}$ to 0.8, whereby the maximum $V_{OUT}$ falls by about 10%.

If in the above example the converter is required to provide a particular output voltage for input voltages in the range of 400V to 300V, then the converter must be designed to accommodate reductions in the maximum duty cycle. In order to accommodate a given drop in the input voltage, the transformer turns ratio N may be correspondingly reduced. However, it is desirable for the transformer T1 to have as high a turns ratio N as possible. This is because a higher turns ratio means less current flowing in the switching circuit 202 which results in lower power dissipation. There are thus competing goals involved in the design of the converter 200. On the one hand it is desirable to have a high turns ratio to minimize power dissipation (which is proportional to $I^2$) and on the other hand the turns ratio should be low enough so that the output voltage remains in regulation over wide ranges in the input voltage.

The preferred embodiment overcomes the above-noted problems by including a blocking time maintenance circuitry 206 which operates to prevent the nominal blocking time $t_{b-NOM}$ from substantially changing in the event the input voltage $V_{IN}$ drops. This is accomplished by altering the volt-time product of the saturable reactors SR1 and SR2 as a function of the input voltage $V_{IN}(t)$.

The blocking time maintenance circuitry comprises a peak detector (such as circuit 210 discussed below) which is connected to the secondary side of the transformer T1 in order to produce a signal having a magnitude proportional to the input voltage $V_{IN}$. A biasing means (such as circuit 209 discussed below), comprising a current source, is provided for resetting the cores of saturable of reactors SR1 and SR2 in a controlled manner. A control means (such as circuit 214 discussed below) is connected to the peak detector in order to control the current source. The control means causes the current source to supply a reset current to the cores of the saturable reactors SR1 and SR2, the magnitude of which is correlated to the percentage difference between the nominal input voltage $V_{IN\text{-}NOM}$ and the actual input voltage $V_{IN}(t)$.

Figure 3:
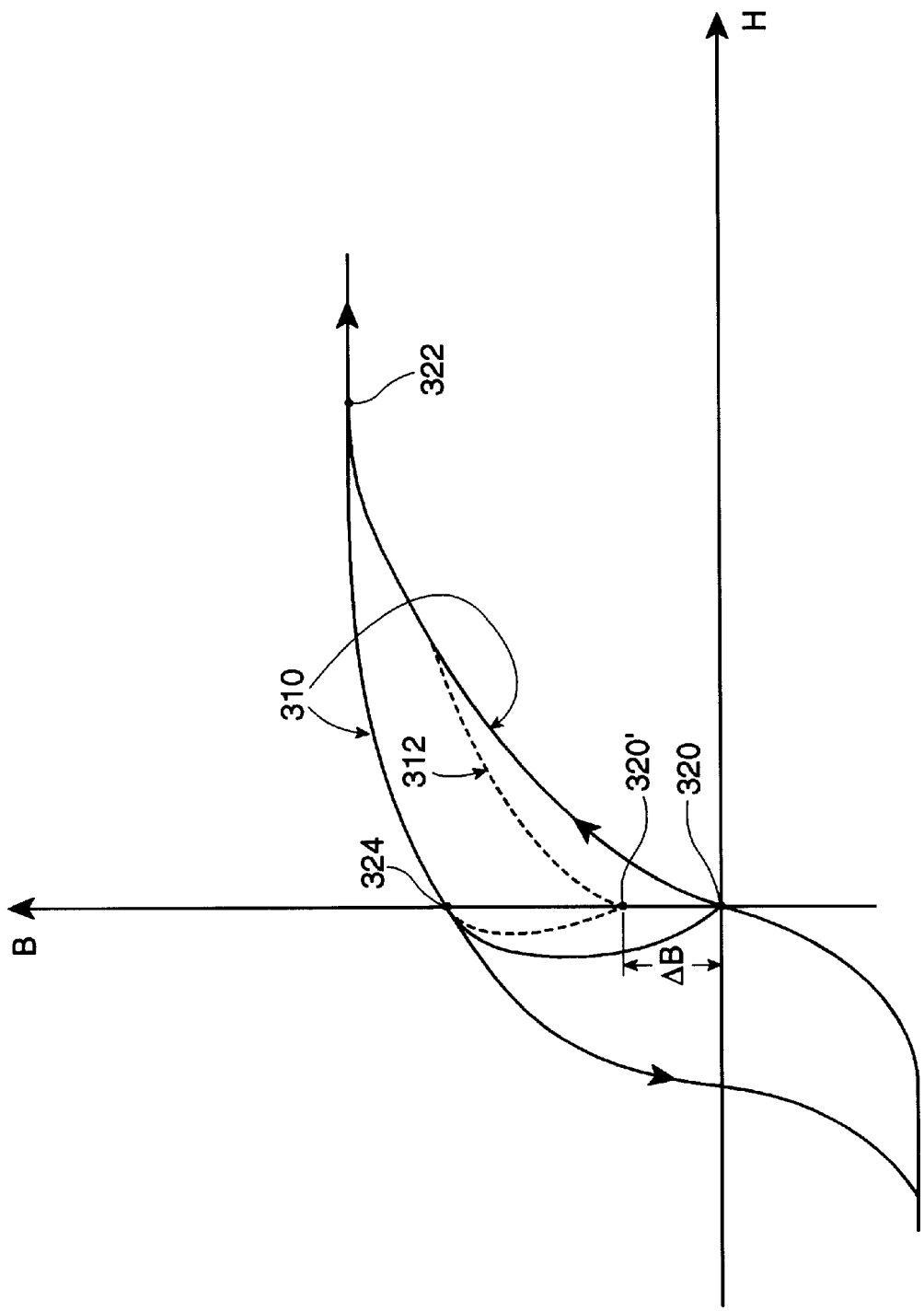
FIG. 3 is hysteresis loop graph of a saturable core reactor illustrating the flux excursion paths experienced by the reactor under various operating conditions.

The magnitude of the reset current may be understood by reference to flux excursion loops 310 and 312 shown in FIG. 3. Loop 310 represents the flux excursion path experienced by the saturable core reactors under nominal conditions, i.e. when $V_{IN}(t)=V_{IN\text{-}NOM}$. More particularly, point 320 is the point at which the core is fully reset. The flux excursion from point 320 to point 322 represents the blocking state which occurs during the freewheeling stage of operation. The change in the magnetic flux (ΔB) from point 320 to point 322 is equal to the volt-time product provided by the saturable reactor, from which the blocking interval $t_b$ is derived. At point 322, the core is saturated. As the current inducing a magnetic flux in the core is reduced to zero, the core reaches a bias condition (H=0) at point 324. A nominal negative or "reset" current $I_{RESET\text{-}NOM}$, provided by the parasitic capacitances C5 or C6 of output diodes D5 and D6, or alternatively by an auxiliary reset current, causes the saturable core to return to its initial state at point 320 and thus "resets" the core.

When the input voltage falls below $V_{IN\text{-}NOM}$, it is desired to reduce the volt-time product (i.e. ΔB) so that the blocking time remains at $t_{b\text{-}NOM}$. This is accomplished by controlling the amount of reset current provided on the flux excursion path from point 324 to the core reset point. If the reset current $I_{RESET}$ is less than the nominal reset current $I_{RESET\text{-}NOM}$, the flux excursion path will follow loop 312 so that the core will reset at point 320' instead of point 320. On the next cycle, the blocking state corresponds to the flux excursion from point 320' to point 322. It will be noticed that ΔB from point 320' to point 322 is less than ΔB from point 320 to point 322, so that the volt-time product, and hence the blocking time provided by the core, is reduced. The magnitude of the reset current to keep the blocking interval $t_b$ relatively constant will depend on the hysteresis (i.e. BH) loop of the saturable core material, but is correlated to the percentage difference x between the nominal input voltage $V_{IN\text{-}NOM}$ and the actual input voltage $V_{IN}(t)$. In the preferred embodiment, as explained in greater detail below, a generally linear relationship is employed so that when $V_{IN}(t)=x\,V_{IN\text{-}NOM}$, $I_{RESET}=x^*I_{RESET\text{-}NOM}$.

In the preferred embodiment shown in FIG. 1, the peak detector is provided by negative peak voltage detection circuit 210 which comprises diodes D7 and D8 and a capacitor $C_P$. This circuit senses $V_{S1}$ and $V_{S2}$. During the power stage of the first half cycle of the operation of converter 200, $V_{S1}$ is positive but $V_{S2}$ is negative such that D7 conducts and $C_P$ is charged, whereby node 212 exhibits a voltage equal to the negative peak value of $V_{S2}$ (which corresponds to $-\text{peak}(|V_{IN}(t)/N|)$). Similarly, during the power stage of the second half cycle of the operation of converter 200, $V_{S2}$ is positive but $V_{S1}$ is positive such that D8 conducts and $C_P$ is charged, whereby node 212 exhibits a voltage equal to the negative peak value of $V_{S1}$ (which also corresponds to $-\text{peak}(|V_{IN}(t)/N|)$). Capacitor $C_P$ preferably exhibits a low capacitance in order to enable the negative peak detection circuit 210 to quickly respond to fast varying input voltage levels.

The control means of the preferred embodiment is a voltage divider network 214 which comprises resistors R2 and R3 connected as shown. Resistor R2 is shown connected to a supply terminal 214. If this terminal is not available, resistor R2 may be connected to $V_{OUT}$ at node 218 since the output voltage is relatively constant. R2 and R3 each have a relatively high resistance in order to keep the current through these resistors low and reduce power losses. However the resistances must be low enough to allow $C_P$ to discharge somewhat between power stages so that the negative peak detection circuit 210 responds quickly to changes in the input voltage.

The biasing means of the preferred embodiment includes additional reset windings 208a nd 208b applied to each saturable core reactor SR1 and SR2 in an opposite polarity as shown in FIG. 1. The reset windings 208 are connected in series with resistor R1, diode D9 and the drain of a transistor Q5. These components collectively compose circuit 209. The source of transistor Q5 is connected to ground, and the gate of transistor Q5 is connected to the output of the voltage divider network 214. Circuit 209 is shown connected to the supply terminal 214; however, if this terminal is not available, the series combination may be connected to $V_{OUT}$ at node 218.

The current source of the biasing means is provided by the parasitic capacitances C5 and C6 (of diodes D5 and D6) and transistor Q5. In the preferred embodiment, capacitances C5 and C6 provide the nominal reset current $I_{RESET\text{-}NOM}$ (i.e., the negative current required for the flux excursion between points 324 and 320 in FIG. 3). Thus, given the polarity of the reset windings 208, Q5 provides a current which increases as $V_{IN}(t)$ drops in order to reduce the net reset current applied to the cores of the saturable reactors SR1 and SR2. The values of R2 and R3 are selected such that when $V_{IN}(T)=V_{IN\text{-}NOM}$, then the output of the voltage divider, $V_{GS}$, is such that Q5 is OFF and no current flows through the reset windings 208. As $V_{IN}(t)$ drops, $V_{GS}$ rises causing Q5 to conduct and hence current to flow through the reset windings 208. Resistor R1 limits the current generated by Q5. In the preferred embodiment, Q5 is operated in the triode region and thus the current provided by Q5 is inversely proportional to $V_{IN}(t)$, although the net reset current applied to each saturable reactor core (due to the reverse current of D5 or D6 and the counteracting current of Q5) is generally linearly proportional to $V_{IN}(t)$.

Figure 4:
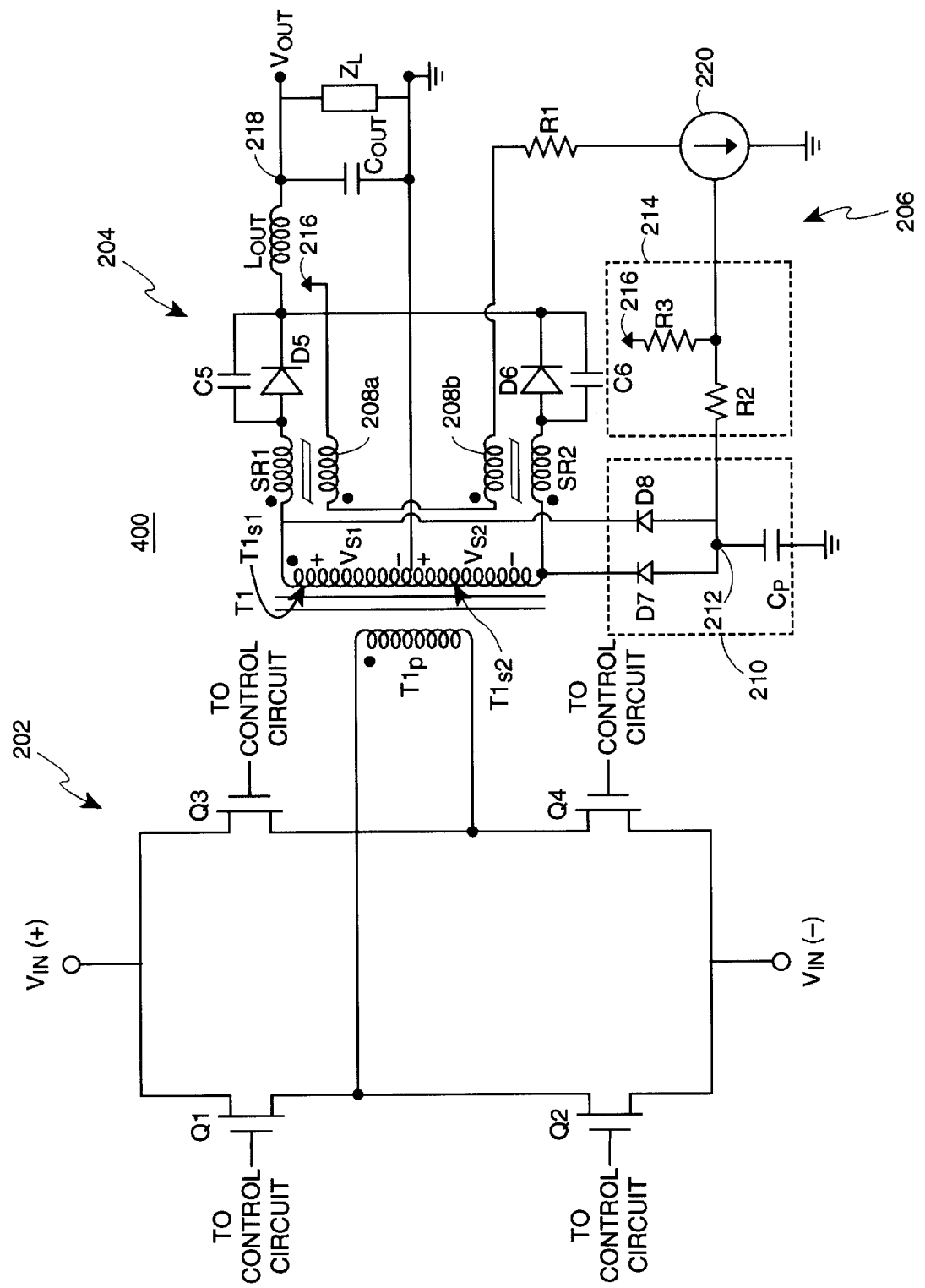
FIG. 4 is a circuit diagram of the resonant-transition ZVS converter wherein the blocking time maintenance circuit is constructed according to a first alternative embodiment.

It will also be appreciated that in some applications, the reverse current provided by the output diodes D5 and D6 is insufficient to provide the nominal reset current, $I_{RESET\text{-}NOM}$. In this case, as shown in converter 400 of FIG. 4, the polarity of the reset windings 208 are reversed in comparison to converter 200 so that the current provided by a current source 220 is added to the diode reverse current (as opposed to counteracting this current in converter 200) in order to provide $I_{RESET\text{-}NOM}$. In this embodiment, the current generated by current source 220 is proportional to $V_{IN}(t)$.

Figure 5:
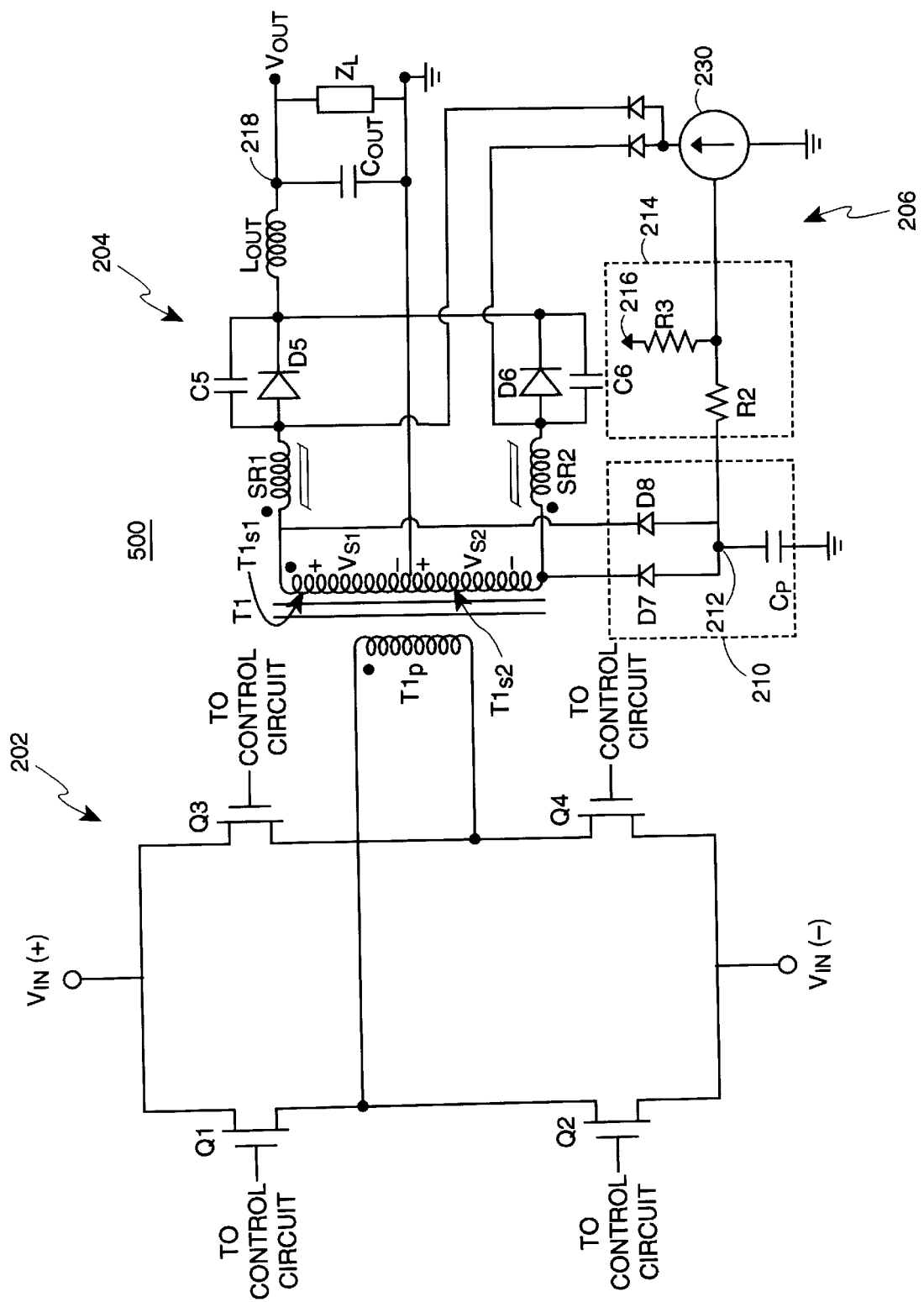
FIG. 5 is a circuit diagram of the resonant-transition ZVS converter wherein the blocking time maintenance circuit is constructed according to a second alternative embodiment.

In another alternative embodiment shown as converter 500 in FIG. 5, the biasing means may omit reset windings 208 such that a current source 230 supplies current directly to the sole windings of SR1 and SR2 as shown. In this embodiment, the current source 230 also generates current in proportion to $V_{IN}(t)$, but it will be noted that the direction of the current is opposite to that of current source 220 in converter 400.

The discussion above relates to converters in which the saturable reactors SR1 and SR2 have cores made of a soft magnetic material. It will be understood by those skilled in the art that the principles of the invention may be similarly applied to converters which employ saturable reactors with cores having square BH loop characteristics. Similarly, those skilled in the art will appreciate that other modifications and variations may be made to the embodiments disclosed herein without departing from the spirit of the invention.

I claim:

1. An improvement in a full bridge resonant-transition ZVS power converter comprising a power switching circuit connected to a transformer having a primary side and a secondary side having two secondary windings, wherein each transformer secondary winding has a saturable core reactor and an output rectifier connected in series therewith in order to cause an unequal current distribution during a freewheeling interval of operation, said improvement comprising:

a peak detector, connected to the secondary side of the transformer, for producing a signal having a magnitude proportional to an input voltage applied across the primary side of the transformer;

biasing means, comprising a current source, for resetting the cores of the saturable reactors; and control means, connected to the peak detector, for controlling the current source to produce a reset current in accordance with the percentage difference between a nominal input voltage and an actual input voltage in order to maintain a relatively constant blocking time over an input voltage range.

2. The improvement according to claim 1, wherein the reset current generated by the current source is generally proportional to the percentage difference between the nominal input voltage and the input voltage.

3. The improvement according to claim 2, wherein the current source comprises at least one of (i) a transistor connected to the saturable reactors, and (ii) a reverse current provided by the output rectifiers.

4. The improvement according to claim 3, wherein the biasing means comprise a reset winding applied to the core of each saturable reactor, said reset windings being connected in series with said transistor.

5. The improvement according to claim 4, wherein the control means comprises a voltage divider network having a center node connected to a base or gate input of the transistor.

6. The improvement according to claim 1, wherein the current source comprises at least one of (i) a transistor connected to the saturable reactors, and (ii) a reverse current provided by the output rectifiers.

7. The improvement according to claim 6, wherein the biasing means comprise a reset winding applied to the core of each saturable reactor, said reset windings being connected in series with said transistor.

8. The improvement according to claim 7, wherein the control means comprises a voltage divider network having a center node connected to a base or gate input of the transistor.

9. An improvement in a full bridge resonant-transition ZVS power converter comprising a power switching circuit connected to a transformer having a primary side and a secondary side having two secondary windings, wherein each transformer secondary winding has a saturable core reactor and an output rectifier connected in series therewith in order to cause an unequal current distribution during a freewheeling interval of operation, said improvement comprising:

a peak detector, connected to the secondary side of the transformer, for producing a signal having a magnitude proportional to an input voltage applied across the primary side of the transformer;

biasing means, comprising a current source, for resetting the cores of the saturable reactors; and control means, connected to the peak detector, for controlling the current source to produce a reset current having a magnitude correlated to the input voltage in order to maintain a relatively constant blocking time over an input voltage range.

10. An improvement in a full bridge resonant-transition ZVS power converter comprising a power switching circuit connected to a transformer having a primary side and a secondary side having two secondary windings, wherein each transformer secondary winding has a saturable core reactor and an output rectifier connected in series therewith in order to cause an unequal current distribution during a freewheeling interval of operation, said improvement comprising:

a peak detector, connected to the secondary side of the transformer, for producing a signal having a magnitude proportional to an input voltage applied across the primary side of the transformer;

biasing means, comprising a current source, for resetting the cores of the saturable reactors; and control means, connected to the peak detector, for controlling the current source to produce a reset current having a magnitude proportional to the input voltage in order to maintain a relatively constant blocking time over an input voltage range.

11. A circuit in combination with a saturable core reactor adapted to provide a blocking time, said circuit for maintaining a generally constant blocking time and comprising:

a peak detector for determining the voltage applied across the saturable core reactor;

biasing means, comprising a current source, for resetting the cores of the saturable reactors; and control means, connected to the peak detector, for controlling the current source to produce a reset current having a magnitude correlated to the applied voltage in order to maintain a relatively constant blocking time over a range of applied voltages.

12. The circuit according to claim 11, wherein the reset current generated by the current source is generally proportional to the percentage difference between a nominal applied voltage and the applied voltage.

13. The circuit according to claim 11, wherein the current source comprises a transistor connected to the saturable reactor.

14. The circuit according to claim 12, wherein the biasing means comprises a reset winding applied to the core of the saturable reactor, said reset winding being connected in series with said current source.

15. The circuit according to claim 13, wherein the control means comprises a voltage divider network having a center node connected to a base or gate input of the transistor.

* * * * *